United States Patent [19]
Clarke

[11] Patent Number: 5,331,937
[45] Date of Patent: Jul. 26, 1994

[54] CHARGE INLET SYSTEM FOR INTERNAL COMBUSTION ENGINE

[75] Inventor: James R. Clarke, Northville, Mich.

[73] Assignee: Ford Motor Company, Dearborn, Mich.

[21] Appl. No.: 1,695

[22] Filed: Jan. 7, 1993

[51] Int. Cl.⁵ .................. F02M 31/06; F02M 31/125
[52] U.S. Cl. .......................... 123/491; 123/179.14; 123/179.21; 123/548
[58] Field of Search .............. 123/491, 179.14, 179.15, 123/179.21, 52 MV, 179.12, 179.13, 179.9, 548, 472, 470

[56] References Cited

U.S. PATENT DOCUMENTS

| | | | |
|---|---|---|---|
| 3,847,130 | 11/1974 | Miyoshi et al. | 123/491 |
| 3,930,477 | 1/1976 | Jordan | 123/546 |
| 4,213,432 | 7/1980 | Levy | 123/549 |
| 4,242,992 | 1/1981 | Kawamura et al. | 123/491 |
| 4,295,458 | 10/1981 | Pellerin | 123/590 |
| 4,378,001 | 3/1983 | Takeda et al. | 123/472 |
| 4,379,443 | 4/1983 | Granger | 123/549 |
| 4,381,756 | 3/1983 | Waschkuttis | 123/591 |
| 4,413,605 | 11/1983 | Leoni | 123/547 |
| 4,452,219 | 6/1984 | Tay-Lodge et al. | 123/591 |
| 4,569,322 | 2/1986 | Gristina | 123/568 |
| 4,570,598 | 2/1986 | Samson et al. | 123/445 |
| 5,040,518 | 8/1991 | Hamm | 123/557 |
| 5,063,885 | 11/1991 | Yoshioka | 123/52 MV |

FOREIGN PATENT DOCUMENTS 438769 11/1935 United Kingdom ............ 123/179.9

Primary Examiner—Andrew M. Dolinar
Attorney, Agent, or Firm—Jerome R. Drouillard; Roger L. May

[57] ABSTRACT

A charge inlet system for a spark ignited reciprocating internal combustion engine includes a plenum for receiving intake air and having a plurality of intake runners extending to the intake valves of the engine. Fuel flowing through primary fuel injectors is supplemented by fuel provided by a secondary fuel injector in the event that the engine is being started.

16 Claims, 2 Drawing Sheets

CHARGE INLET SYSTEM FOR INTERNAL COMBUSTION ENGINE

BACKGROUND OF THE INVENTION

The present invention pertains to a charge inlet system for a reciprocating spark ignited internal combustion engine, which a secondary fuel injector and associated hardware provides additional fuel to assist in starting the engine, as well as during other operating modes.

SUMMARY OF THE INVENTION

Various types of heating devices have been used for promoting the vaporization of fuel entering the cylinders of reciprocating spark ignited internal combustion engines. One such type of device is shown in U.S. Pat. No. 3,930,477 to Jordan in which the fuel injector sprays upon an electrically powered rod heater. Such a device, as well as others using electrically heated screens extending across the intake passages, suffer from the problem that the heater tends to disturb the flow within the induction air intake port. Moreover, the use of a primary injector alone for the purpose of providing fuel to the engine during start-up suffers from the problem that wetting of the port walls will result with an accompanying increase in undesirable exhaust emissions from the engine. A system according to the present invention avoids the undesirable characteristics of prior art starting enhancement systems because the present system functions so as to prevent unvaporized fuel from being entrained within the intake runners, so as to pass into the engine cylinders.

According to the present invention, a charge inlet system for a reciprocating spark ignited internal combustion engine includes a plenum for receiving intake air, a plurality of intake runners extending from the plenum to the intake valves of the engine, a plurality of primary fuel injectors with one such injector being mounted in each of the intake runners so as to discharge fuel into the air being conducted into the engine cylinders, and a secondary fuel injector mounted so as to discharge within the plenum when the engine is being started, so as to provide additional fuel to assist in starting. The secondary fuel injector, which is sometimes termed a "startup injector" in this specification, may be advantageously located within the top wall of the plenum so as to discharge into a reservoir located in the floor of the plenum such that fuel introduced by the start-up injector is contained in the reservoir until being vaporized. Vaporization may be enhanced by use of an electrically operated means for heating the fuel and/or by means for conducting gases from the crankcase of the engine through the reservoir such that fuel contained within the reservoir is at least partially vaporized. If the engine is of the vee configuration, the plenum may be located between the banks of the cylinders, below the intake runners, such that the runners extend upwardly and laterally from the plenum.

According to another aspect of the present invention, a charge inlet system for an internal combustion engine may include a controller and sensor for measuring at least one operating parameter of the engine and for controlling the operation of the primary fuel injectors and start-up fuel injector, as well as the fuel heating means, in response to at least one engine operating parameter.

DETAILED DESCRIPTION OF THE PREFERRED EMBODIMENTS

Figure 1:
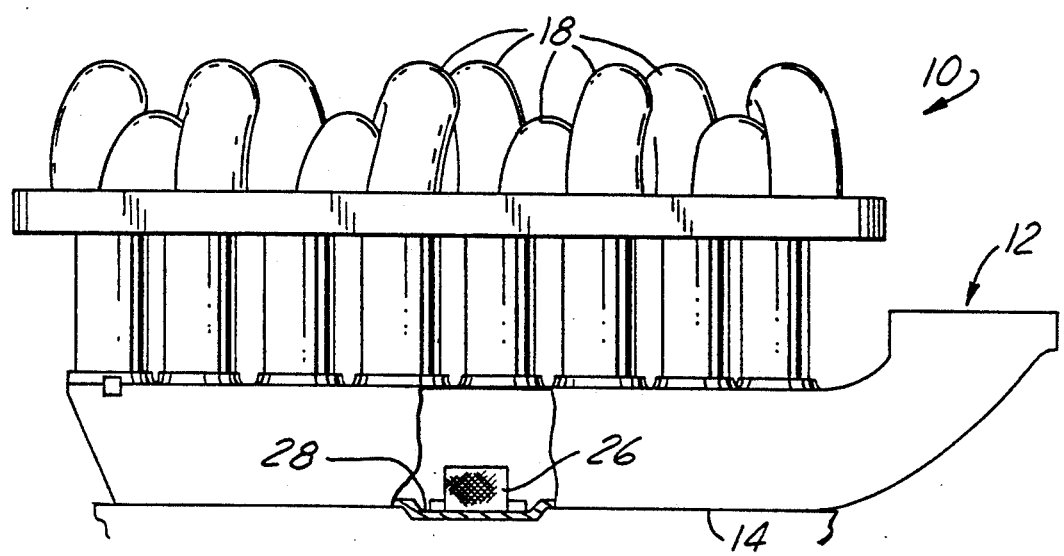
FIG. 1 is a side elevation of a charge inlet system for an internal combustion engine according to the present invention.
Figure 2:
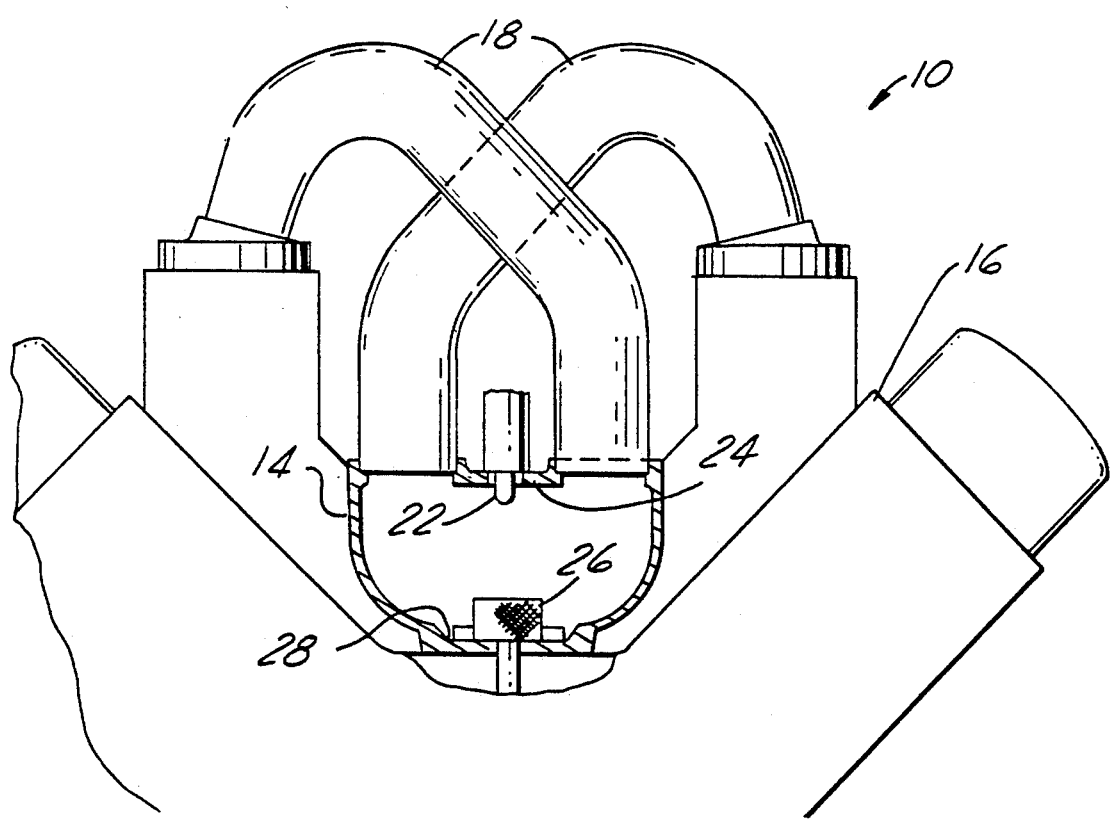
FIG. 2 is an end elevation, partially cut away, of an engine charge inlet system according to the present invention.

As shown in FIGS. 1 and 2, a charge inlet system, 10, for a reciprocating internal combustion engine includes an air inlet, 12, for allowing combustion air to enter the engine. Air passing through inlet 12 moves through plenum 14 initially and then through a plurality of intake runners, 18, which extend from plenum 14 to the intake valves of the engine. Fuel is introduced to the air moving through the charge inlet system by two separate means. First, fuel is introduced through a plurality of primary fuel injectors, 20, shown schematically in FIG. 4, with one such injector being mounted in each of the runners so as to discharge fuel into the air being conducted into the engine cylinders. Primary fuel injectors 20 may be mounted in conventional fashion near the intake ports contained within the engine's cylinder heads. Fuel is also introduced to the air moving through the charge inlet system by means of a start-up fuel injector, 22, shown in FIGS. 2 and 4. Start-up fuel injector 22 is mounted, a shown in FIG. 2, in the top wall, 24, of plenum 14, so as to discharge within plenum 14 when the engine is being started. In this manner, additional fuel is provided to assist in starting.

With a vee type of engine illustrated in FIG. 2, plenum 14 may advantageously be located between cylinder banks 16. This will allow runners 18 to extend generally upwardly and laterally from plenum 14, with the result that liquid fuel entering the charge inlet system from start-up injector 22 will effectively be prevented from entering runners 18.

Figure 3:
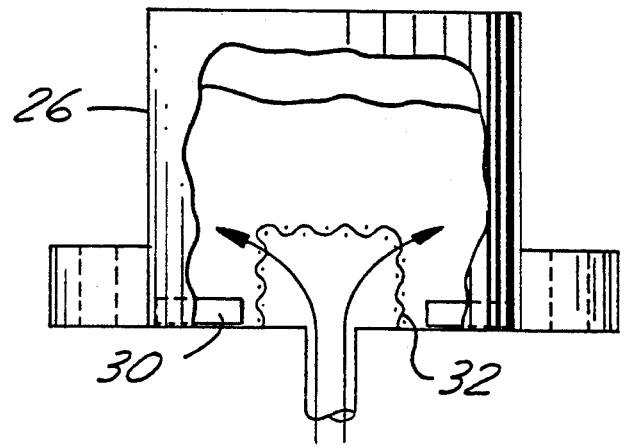
FIG. 3 is a schematic representation of a reservoir comprising a portion of a charge inlet system according to the present invention.
Figure 4:
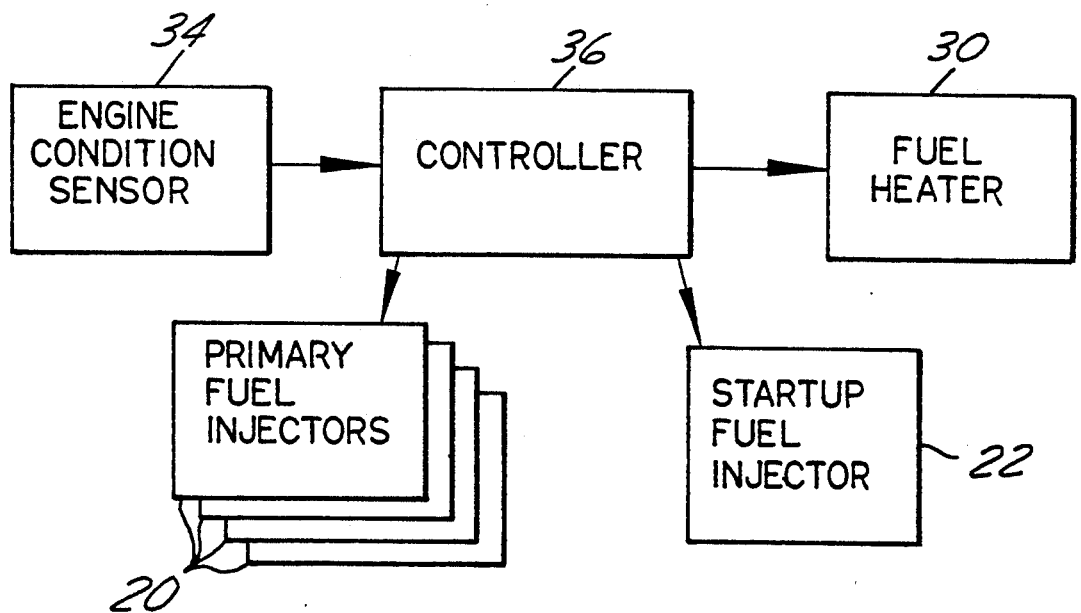
FIG. 4 is a block diagram of a portion of a system according to the present invention.

A reservoir means, 26, is located in the floor, 28, of plenum 14, such that fuel discharged by start-up injector 22 will be directed into reservoir 26 and contained within reservoir 26 until the fuel is at least partially vaporized. FIG. 3 illustrates a cut-away view of reservoir 26, which shows additional fuel vaporizing devices. An electrically operated heater, 30, such as a positive temperature coefficient heater operated by an engine controller, as shown in FIG. 4, may be used to provide additional heat for vaporizing fuel contained within reservoir 26. Reservoir 26 may also contain a positive crankcase ventilation (PCV) flow guide and check valve, 32, for allowing gases generated within the crankcase to provide additional heat and agitation action to the fuel contained within reservoir 26 so as to promote the vaporization of fuel. Blowby gases from the crankcase pass through flow guide and check valve 32 and then bubble through fuel pooled in reservoir 26.

As shown in FIG. 4, primary fuel injectors 20 and start-up fuel injector 22, as well as fuel heater 30 are operated by an engine controller 36. Controller 36 receives information on the engine's condition from at least one sensor, 34, which may comprise a plurality of sensors, such as an engine coolant sensor, an exhaust gas temperature sensor, an ambient temperature sensor, a throttle position sensor, or other type of sensor used for obtaining information regarding the operating condition of the engine. Additionally, a clock may be utilized to track the time which has passed following engine startup.

In general, controller 36 will operate the start-up fuel injector or secondary injector 22 upon the cranking of the engine. Use of injector 22 may be based upon the sensing of low engine coolant temperature, and/or low ambient temperatures, or other operating parameters. Operation of start-up fuel injector 22 will preferably be accompanied by the operation of fuel heater 30, or by auxiliary devices such as an electric heater associated with start-up injector 22, such as a coil or other type of heating device, such as a positive temperature coefficient device intended to heat fuel passing through injector 22, or by operating an air passing through start-up fuel injector 22. These devices assist device wherein injector 22 includes means for using compressed air intended to promote vaporization of fuel are known to those skilled in the art.

Operation of fuel heater 30, and/or the flow of crankcase gases through PCV flow guide and check valve 32, as well as direct fuel heating via start-up fuel injector 22, will assist in the vaporization of fuel passing through start-up fuel injector 22, and thereby promote faster starting of the engine. In general, the engine will be operated upon fuel from secondary injector 22 during startup and until a specified engine parameter, such as transmission gear selection, or an appropriate throttle opening, such as off-idle is sensed, at which time secondary injector 22 will be shut off and primary injectors 22 placed into operation.

I claim:

1. A charge inlet system for a reciprocating, spark-ignited internal combustion engine, comprising:
   a plenum for receiving intake air;
   a plurality of intake runners extending from said plenum to the intake valves of the engine;
   a plurality of primary fuel injectors, with one such injector being mounted in each of said runners, so as to discharge fuel into the air being conducted to the engine cylinders; and
   a startup fuel injector mounted so as to discharge within said plenum when said engine is being started, so as to provide additional fuel to assist in starting with said startup injector being located within the top wall of said plenum, and with said inlet system further comprising a reservoir located in the floor of the plenum such that fuel discharged by the startup injector is contained in the reservoir until being at least partially vaporized, with said reservoir further comprising an electrically operated means for heating and at least partially vaporizing fuel contained within the reservoir.

2. A discharge inlet system according to claim 1, wherein said engine is of the vee configuration, with said plenum being located between the banks of cylinders.

3. A charge inlet system according to claim 2, wherein said plenum is located generally below the intake runners, such that the runners extend upwardly and laterally from the plenum.

4. A charge inlet system according to claim 1, wherein said startup injector includes means for electrically heating the fuel passing therethrough.

5. A charge inlet system according to claim 1, wherein said startup injector includes means for using compressed air to assist the vaporization of the fuel passing therethrough.

6. A charge inlet system according to claim 1, further comprising a controller and sensor for measuring at least one operating parameter of the engine and for controlling the operation of said primary fuel injectors and said startup fuel injector in response to said at least one parameter.

7. A charge inlet system for a reciprocating, spark ignited internal combustion engine, comprising:
   a plenum for receiving intake air;
   a plurality of intake runners extending from said plenum to the intake valves of the engine;
   a plurality of primary fuel injectors, with one such injector being mounted in each of said runners, so as to discharge fuel into the air being conducted to the engine cylinders;
   a startup fuel injector mounted so as to discharge within said plenum when said engine is being started, so as to provide additional fuel to assist in starting;
   a reservoir for receiving fuel from said startup injector, with said reservoir being located in the floor of the plenum such that fuel discharged by said startup injector is contained in said reservoir until being at least partially vaporized;
   means for heating and at least partially vaporizing fuel contained within the reservoir; and
   a controller and sensor for measuring at least one operating parameter of the engine and for controlling the operation of said primary fuel injectors and said startup fuel injector and said heating means in response to said at least one parameter.

8. A charge inlet system according to claim 7, wherein said reservoir further comprises an electrically operated means for heating and and at least partially vaporizing fuel contained within the reservoir.

9. A charge inlet system according to claim 7, wherein said reservoir further comprises means for conducting gases from the crankcase of the engine through the reservoir such that fuel contained within the reservoir is at least partially vaporized.

10. A charge inlet system according to claim 7, wherein said engine is of the vee configuration, with said plenum being located between the banks of cylinders.

11. A charge inlet system according to claim 7, wherein said plenum is located generally below the intake runners, such that the runners extend upwardly and laterally from the plenum.

12. A charge inlet system according to claim 7, wherein said startup injector is located within the top wall of said plenum.

13. A charge inlet system for a reciprocating, spark ignited internal combustion engine, comprising:
   a plenum for receiving intake air;
   a plurality of intake runners extending from said plenum to the intake valves of the engine;
   a plurality of primary fuel injectors, with one such injector being mounted in each of said runners, so as to discharge fuel into the air being conducted to the engine cylinders;
   a secondary fuel injector mounted so as to discharge within said plenum;
   a reservoir for receiving fuel from said secondary injector such that fuel discharged by said secondary injector is contained in said reservoir until being at least partially vaporized and carried into the engine cylinders by charge air; and a controller and at least one sensor for measuring at least one operating parameter of the engine and for controlling the operation of said primary fuel injectors and said secondary fuel injector in response to said at least one parameter such that said engine is operated selectively upon fuel injected primarily by said secondary injector, or upon fuel injected primarily by said primary injectors.

14. A charge inlet system according to claim 13, wherein said engine is operated upon fuel from said secondary injector during startup and until a specified engine parameter is sensed, at which time the secondary injector is shut off and the primary injectors are placed into operation.

15. A charge inlet system according to claim 13, wherein said reservoir is located in the floor of said plenum such that the spray from said secondary injector is directed into said reservoir.

16. A charge inlet system for a reciprocating, spark-ignited internal combustion engine, comprising:

a plenum for receiving intake air;

a plurality of intake runners extending from said plenum to the intake valves of the engine;

a plurality of primary fuel injectors, with one such injector being mounted in each of said runners, so as to discharge fuel into the air being conducted to the engine cylinders; and a startup fuel injector mounted so as to discharge within said plenum when said engine is being started, so as to provide additional fuel to assist in starting with said startup injector being located within the top wall of said plenum, and with said inlet system further comprising a reservoir located in the floor of the plenum such that fuel discharged by the startup injector is contained in the reservoir until being at least partially vaporized, with said reservoir further comprising means for conducting gases from the crankcase of the engine through the reservoir such that fuel contained within the reservoir is vaporized.

* * * * *